(12) United States Patent
Dobrenizki et al.

(10) Patent No.: US 12,160,006 B2
(45) Date of Patent: Dec. 3, 2024

(54) ELECTRODE UNIT AND REDOX FLOW CELL

(71) Applicant: Schaeffler Technologies AG & Co. KG, Herzogenaurach (DE)

(72) Inventors: Ladislaus Dobrenizki, Höchstadt (DE); Moritz Wegener, Erlangen (DE); Johannes Landmann, Nuremberg (DE); Tim Hosenfeldt, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 493 days.

(21) Appl. No.: 17/632,845

(22) PCT Filed: Jul. 3, 2020

(86) PCT No.: PCT/DE2020/100589
§ 371 (c)(1),
(2) Date: Feb. 4, 2022

(87) PCT Pub. No.: WO2021/027988
PCT Pub. Date: Feb. 18, 2021

(65) Prior Publication Data
US 2022/0293960 A1    Sep. 15, 2022

(30) Foreign Application Priority Data
Aug. 12, 2019 (DE) .......................... 102019121673.7

(51) Int. Cl.
*H01M 4/66* (2006.01)
*H01M 8/18* (2006.01)

(52) U.S. Cl.
CPC .......... *H01M 4/667* (2013.01); *H01M 4/661* (2013.01); *H01M 4/664* (2013.01); *H01M 8/188* (2013.01)

(58) Field of Classification Search
CPC ...... H01M 4/667; H01M 4/661; H01M 4/664; H01M 8/188
See application file for complete search history.

(56) References Cited

FOREIGN PATENT DOCUMENTS

| CN | 106025061 | 7/2018 |
|---|---|---|
| CN | 108701841 B | 2/2022 |
| DE | 102009035314 | 3/2011 |
| JP | 2010086935 A | 4/2010 |
| JP | 2019512148 | 5/2019 |
| JP | 2020507895 | 3/2020 |
| WO | 2013118277 A1 | 8/2013 |
| WO | 2016001400 A1 | 1/2016 |

(Continued)

OTHER PUBLICATIONS

Aaron Hollas et al., "A biomimetic high-capacity phenazine-based anolyte for aqueous organic redox flow batteries", Nature Energy, vol. 3, pp. 508-514, Jun. 2018.

(Continued)

*Primary Examiner* — Jimmy Vo
(74) *Attorney, Agent, or Firm* — Volpe Koenig

(57) ABSTRACT

An electrode unit (1, 1a, 1b), in particular for a redox flow cell (8), including at least one metallic substrate (2) and a coating (3) which is applied to the substrate (2), wherein the coating (3) includes at least one protective layer (4) which is formed from titanium-niobium nitride (TiNbN) and/or titanium-niobium carbide (TiNbC). A redox flow cell (8), in particular a redox flow battery, having at least one such electrode unit (1, 1a, 1b) is also provided.

20 Claims, 3 Drawing Sheets

(56) References Cited

FOREIGN PATENT DOCUMENTS

| | | |
|---|---|---|
| WO | 2018025737 A1 | 2/2018 |
| WO | 2018145720 | 8/2018 |
| WO | 2018146342 | 8/2018 |
| WO | 2020100395 | 5/2020 |

OTHER PUBLICATIONS

Michael Naguib et al., "MXene: a promising transition metal carbide anode for lithium-ion batteries" Electrochemistry Communications, Elsevier, Amsterdam, NL, vol. 16, No. 1, (Jan. 3, 2012), pp. 61-64, Jan. 3, 2012. [retrieved on Jan. 9, 2012].

ELECTRODE UNIT AND REDOX FLOW CELL

CROSS-REFERENCE TO RELATED APPLICATIONS

This application is the U.S. National Phase of PCT Appln. No. PCT/DE2020/100589, filed Jul. 3, 2020, which claims priority from German Patent Application No. 10 2019 121 673.7, filed Aug. 12, 2019, the entire disclosures of which are incorporated by reference herein.

TECHNICAL FIELD

The disclosure relates to an electrode unit, in particular for a redox flow cell, comprising at least one metallic substrate and a coating which is applied to the substrate. The disclosure also relates to a redox flow cell with at least one such electrode unit.

BACKGROUND

Electrode units of the type mentioned above and redox flow cells equipped therewith, in particular redox flow batteries or flow batteries, are sufficiently known.

Redox flow batteries are storage devices for electrical energy, wherein the electrical energy is stored in liquid chemical compounds or electrolytes, a so-called anolyte and a so-called catholyte. The electrolytes are located in two reaction chambers separated from one another by a polymer electrolyte membrane. An ion exchange between the anolyte and the catholyte takes place via this membrane, releasing electrical energy. The electrical energy released is tapped via one electrode unit each in contact with the anolyte and the catholyte. The electrolytes are circulated in the reaction chambers by means of pumps and flow along the respective facing surface of the membrane. Since the electrolytes can be stored in tanks of any size, the amount of energy stored in the redox flow battery depends only on the size of the tanks used.

Flow battery systems as storage systems provide a sustainable energy supply for stationary and mobile application fields by means of renewable energies. In order to achieve high efficiencies and power densities, the aim is to have battery stacks that are as compact as possible. However, high power densities pose major challenges regarding the individual components of a battery stack.

WO 2018/145720 A1 describes an electrode unit of the type mentioned above and a redox flow battery in which the electrode unit is used. In this context, it describes, among other things, the formation of the substrate from a composite material.

WO 2018/146342 A1 discloses various lignin-based electrolyte compositions for use in redox flow batteries.

The publication "A biomimetic high-capacity phenazine-based anolyte for aqueous organic redox flow batteries", Aaron Hollas et al, Nature energy, Vol. 3, June 2018, pages 508-514, describes anolytes for redox flow batteries based on aqueous "organic" electrolytes or based on aqueous electrolytes with a redox-active organic species. These are becoming increasingly important.

Presently, plate-shaped composites of plastic and graphite are often used as corrosion-resistant substrates for electrode units of redox flow batteries due to the use of strongly basic or acidic electrolytes. These substrates usually have a carbon coating applied to both sides, or there is a carbon felt between the membrane and the electrode unit that can be flowed through. A total plate thickness of the electrode unit in a range of about 0.7 to 1.2 mm is common. Such electrode units are often held in a plastic frame, which entails additional costs for the frame and the assembly process. The size and the manufacturing requirements of such electrode units currently stand in the way of a space-saving geometry of redox flow cells and their efficient industrial production.

SUMMARY

It is the object of the disclosure to provide an electrode unit for a redox flow cell which is easy to manufacture with small thickness dimensions. Another object of the disclosure is to provide a redox flow cell with such an electrode unit.

The object is achieved for the electrode unit, in particular for a redox flow cell, comprising at least one metallic substrate and a coating applied to the substrate, in that the coating comprises at least one protective layer formed from titanium-niobium nitride (TiNbN) and/or titanium-niobium carbide (TiNbC).

Up until now, metallic substrates have not been successfully used for electrode units of redox flow cells, as they have not proven to be sufficiently corrosion-resistant and thus stable in the long term in the used electrolytes. According to the disclosure, the use of a metallic substrate is now possible by means of the aforementioned coating. The use of the electrode unit allows small distances to the membrane and thus enables a space-saving design of a redox flow cell.

The electrode unit with metallic substrate is impermeable to the electrolytes, ensuring proper separation of the reaction chambers within a redox flow cell. At the same time, such electrode units have surfaces which, in addition to the high requirements for electrochemical stability, also meet the requirements for low interface resistance and high catalytic activity.

It has proven successful if only a protective layer of TiNbN or of TiNbC forms the coating. However, individual layers of TiNbN and TiNbC may be alternately applied on the substrate in succession to form a protective layer, or a mixture of TiNbN and TiNbC may be present within an individual layer as a protective layer.

The protective layer preferably has a thickness in the range of 50 to 400 nm, in particular 200 to 300 nm.

In one embodiment of an electrode unit, the coating further comprises at least one adhesion promoting layer arranged between the protective layer and the substrate. The at least one adhesion promoting layer is preferably metallic. In particular, a metallic adhesion promoting layer made up of titanium-niobium (TiNb) has proven effective. The adhesion promoting layer preferably has a layer thickness in the range of 1 to 100 nm.

In a preferred embodiment of an electrode unit, the coating further comprises at least one cover layer arranged on the side of the protective layer facing away from the substrate. The cover layer consists of either carbon or a homogeneous or heterogeneous solid solution or compound of at least one of the combination of materials selected from the group comprising: Ir—C, Ir—Ru—C, Ru—C, Si—C, W—C, Cu—C, Mo—C, Cr—C, Ni—C, Ti—C, wherein a proportion of carbon in the cover layer ranges from 35 to 99.99 at %.

Furthermore, traces of hydrogen, nitrogen, boron, fluorine or oxygen may be present in the cover layer.

It has proven effective when the substrate is formed from stainless steel, 16MnCr5 or a rolling bearing steel. In particular, 100Cr6 or steel of type 1.4404 have proven effective.

The metallic substrate is preferably formed by a metal sheet or plate having a thickness of not more than 1 mm, in particular not more than 0.5 mm. The industrial processing of large-area metal sheets or thin metallic plates can be carried out in a cost-effective manner. The substrate is impermeable to the electrolytes, so it is non-porous and can be designed as a single piece component.

Preferably, the substrate has a three-dimensional profiling on one side or preferably on both sides, at least in regions, forming a flow field. The introduction of such a flow field into a metallic substrate is possible in a cost-effective manner by embossing or the like. Such a flow field directs the flow of the electrolyte into defined paths and is equivalent to a three-dimensional structure in the area of the surface of the substrate. It ensures a homogeneous distribution and flow of the electrolyte on and along the membrane.

The coating is preferably formed on the substrate using a PVD process or a combined PVD/PACVD process. It is advantageous in this regard if the coating is deposited as free of pores as possible or at least only has pores with a diameter of less than 0.1 mm in order to prevent a corroding effect of the electrolyte on the metallic substrate.

It has proven effective if the coating has an overall thickness in the range from 200 to 550 nm.

It has proven effective if the coating covers the substrate at least on one side, preferably on both or all sides. Particularly in the area of the edges of a plate-shaped substrate, there may be uncoated areas or areas with very low coating thickness, which, however, are usually not in contact with an electrolyte due to the separation of the electrolyte chambers and are therefore not considered critical. At minimum, the coating should cover the substrate in a region of contact with an electrolyte of the redox flow cell, i.e., in a region used in direct contact with an anolyte or catholyte.

Some preferred examples of coatings on metallic substrates for forming electrode units according to the disclosure are stated in the following:

Example 1

Metallic substrate: 16MnCr5
Adhesion promoting layer: none
Protective layer: TiNbN or TiNbC
Cover layer: none Example 2

Metallic substrate: 100Cr6
Adhesion promoting layer: TiNb
Protective layer: TiNbN or TiNbC
Cover layer: none Example 3

Metallic substrate: Stainless steel
Adhesion promoting layer: none
Protective layer: TiNbN or TiNbC
Cover layer: Ir—C or C or Ir—Ru—C or Ru—C Example 4

Metallic substrate: Type 1.4404 steel
Adhesion promoting layer: TiNb
Protective layer: TiNbN or TiNbC
Cover layer: WC or Ni—C or Si—C or Ti—C Example 5

Metallic substrate: 16MnCr5
Adhesion promoting layer: TiNb
Protective layer: TiNbN or TiNbC
Cover layer: Cr—C or Mo—C The object is achieved for a redox flow cell, in particular a redox flow battery, comprising at least one electrode unit according to the disclosure. In particular, flow batteries with aqueous electrolytes comprising a redox-active species on the anolyte side are preferred applications for the electrode units according to the disclosure.

Preferably, the redox flow cell therein comprises at least two electrode units, a first reaction chamber and a second reaction chamber, wherein each reaction chamber is in contact with one of the electrode units and wherein the reaction chambers are separated from each other by a polymer electrolyte membrane.

Small-sized redox flow batteries can be produced due to the small possible thicknesses of the electrode units, which also have a low manufacturing price. Thus, to form a redox flow battery, preferably more than 10, in particular more than 50 redox flow cells are used in an electrically interconnected manner.

The following anolyte is mentioned here as an example as suitable for a redox flow cell or a redox flow battery:
 1.4 M 7,8-dihydroxyphenazine-2-sulfonic acid (short form: DHPS) dissolved in 1 molar sodium hydroxide solution The following catholyte is mentioned here as an example as suitable for a redox flow cell or a redox flow battery:
 0.31 M potassium hexacyanoferrate (II) and 0.31 M potassium hexacyanoferrate (III) dissolved in 2 molar sodium hydroxide solution.

Electrolyte combinations with aqueous electrolytes containing a redox-active organic species on the anolyte side are preferably used to form a redox flow cell or a redox flow battery.

BRIEF DESCRIPTION OF THE DRAWINGS

FIG. 1 shows an electrode unit comprising a metallic substrate having a coating, FIG. 2 shows a cross-section of the electrode unit according to FIG. 1, FIG. 3 shows a cross-section of another electrode unit, FIG. 4 shows a cross-section of another electrode unit, and FIG. 5 shows an electrode unit with a flow field, FIG. 6 shows a redox flow cell or a redox flow battery with a redox flow cell.

DETAILED DESCRIPTION

Figure 1:
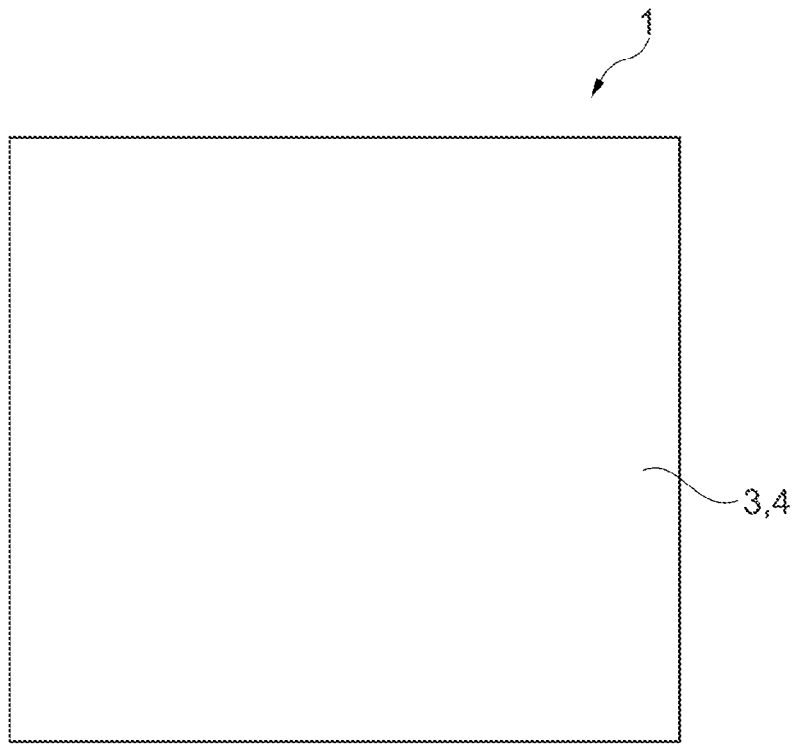
FIGS. 1 to 6 show examples of electrode units according to the disclosure and a redox flow cell or a redox flow battery, respectively. The following is shown.

FIG. 1 shows an electrode unit 1 comprising a metallic substrate 2, in particular made up of sheet steel of grade 1.4404 with a thickness of less than 0.5 mm, with a coating 3 applied to both sides of the substrate 2. The coating 3 here comprises only a protective layer 4 made of TiNbN.

Figure 2:
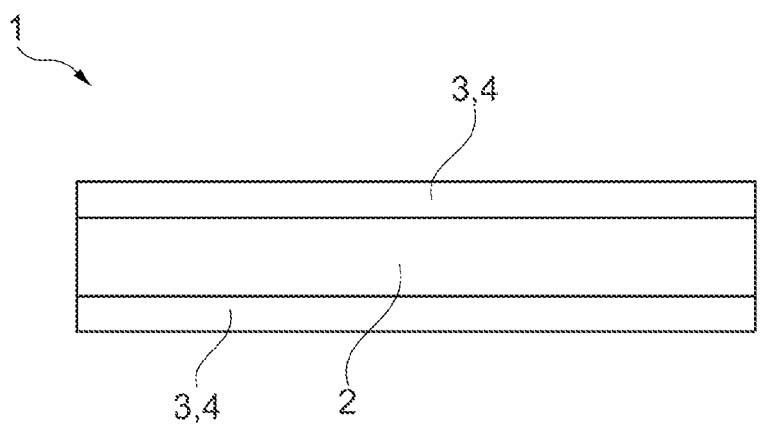

FIG. 2 shows a cross-section of the electrode unit 1 according to FIG. 1. The same reference symbols as in FIG. 1 indicate identical elements.

Figure 3:
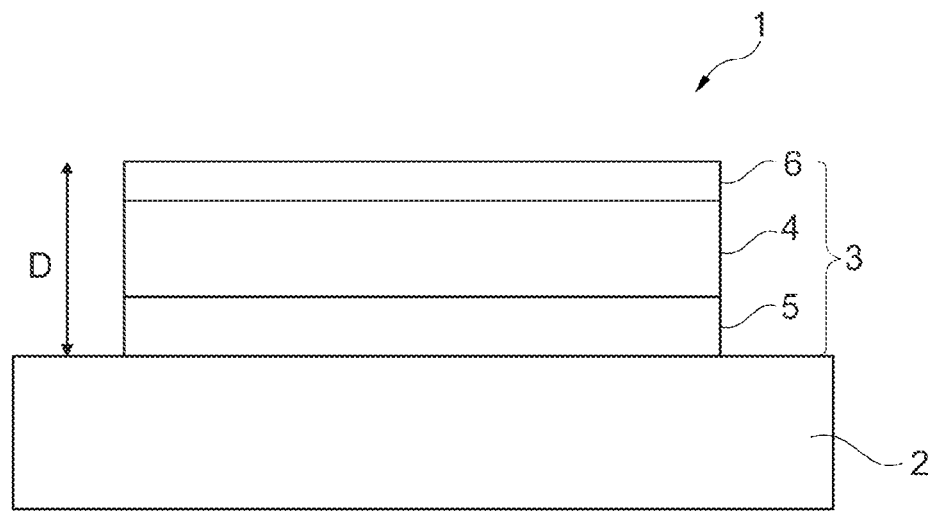

FIG. 3 shows a cross-section of another electrode unit 1 comprising a metallic substrate 2 and a coating 3 applied to one side of the substrate 2. The coating 3 here comprises an adhesion promoting layer 5 made up of TiNb, a protective layer 4 made of TiNbN, and a cover layer 6 made of IrC or pure carbon.

Figure 4:
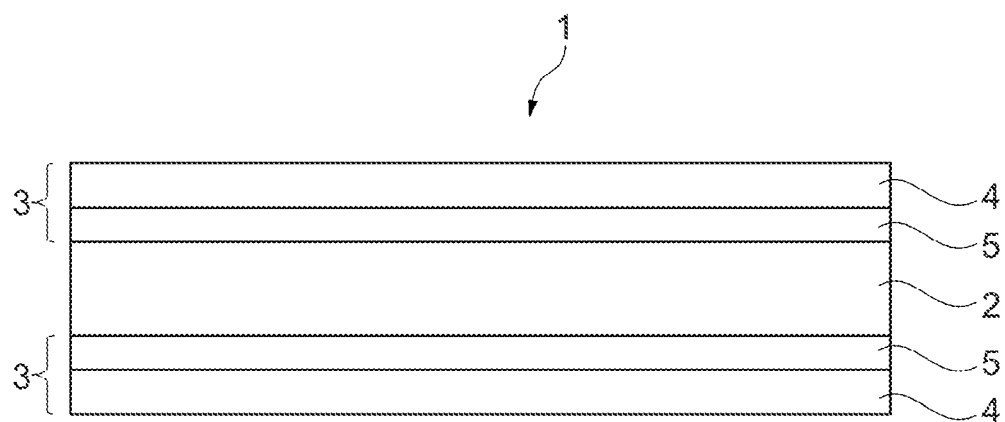

FIG. 4 shows a cross-section of another electrode unit 1 comprising a metallic substrate 2 and a coating 3 applied to both sides of the substrate 2. The coating 3 here comprises an adhesion promoting layer 5 made of TiNb and a protective layer 4 made of TiNbC.

Figure 5:
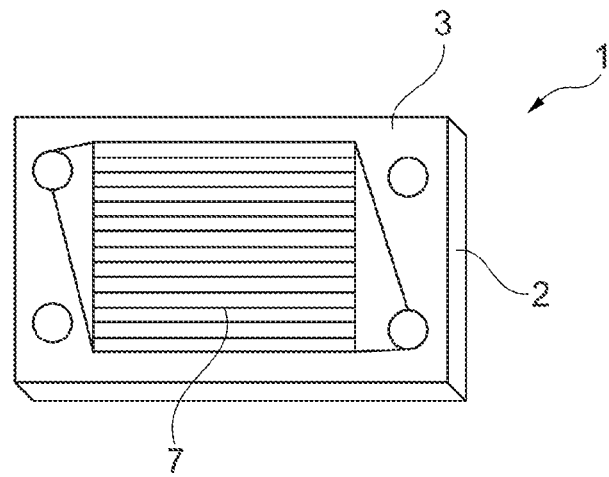

FIG. 5 shows an electrode unit 1 in a three-dimensional view comprising a substrate and a coating 3. A flow field 7 is embossed in the substrate 2 on both sides, resulting in a three-dimensional structuring of the surface of the electrode unit 1.

Figure 6:
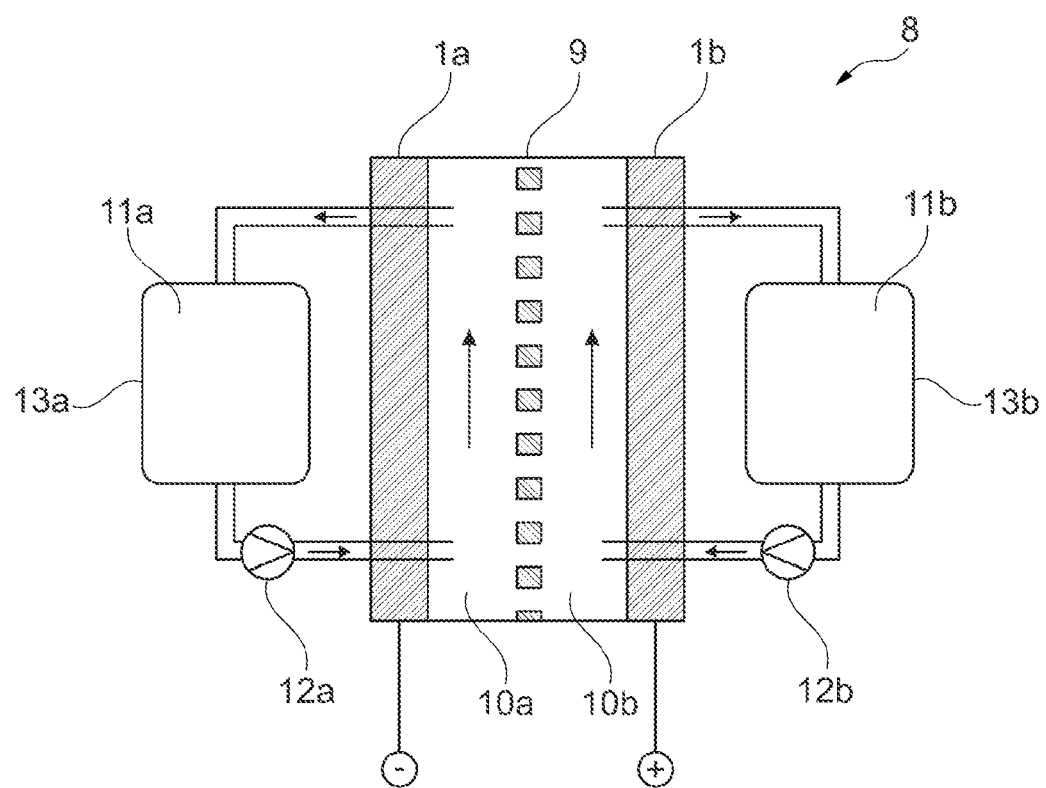

FIG. 6 shows a redox flow cell 8 or a redox flow battery with a redox flow cell 8, respectively. The redox flow cell 8 comprises two electrode units 1a, 1b, a first reaction chamber 10a and a second reaction chamber 10b, wherein each reaction chamber 10a, 10b is in contact with one of the electrode units 1a, 1b. The reaction chambers 10a, 10b are separated from each other by a polymer electrolyte membrane 9. A liquid anolyte 11a is pumped from a tank 13a into the first reaction chamber 10a via a pump 12a and is passed between the electrode unit 1a and the polymer electrolyte membrane 9. A liquid catholyte 11b is pumped from a tank 13b into the second reaction chamber 10b via a pump 12b and is passed between the electrode unit 1b and the polymer electrolyte membrane 9. Ion exchange occurs across the polymer electrolyte membrane 9, releasing electrical energy due to the redox reaction at the electrode units 1a, 1b.

LIST OF REFERENCE SYMBOLS 1, 1a, 1b Electrode unit
2 Metallic substrate
3 Coating
4 Protective layer
5 Adhesion promoting layer
6 Cover layer
7 Flow field
8 Redox flow cell or redox flow battery
9 Polymer electrolyte membrane
10a First reaction chamber
10b Second reaction chamber
11a Anolyte
11b Catholyte
12a, 12b Pump
13a, 13b Tank
D Thickness of the coating

The invention claimed is:

1. An electrode unit, in particular for a redox flow cell, the electrode unit comprising at least one metallic substrate and a coating which is applied to the substrate, the coating comprises at least one protective layer formed from at least one of titanium-niobium nitride or titanium-niobium carbide.

2. The electrode unit according to claim 1, wherein characterized in that the coating further comprises at least one adhesion promoting layer arranged between the protective layer and the substrate.

3. The electrode unit according to claim 2, wherein the at least one adhesion promoting layer is metallic.

4. The electrode unit according to claim 1, wherein the coating further comprises at least one cover layer arranged on a side of the protective layer facing away from the substrate and either formed from carbon or formed from a homogeneous or heterogeneous solid solution or compound of at least one of the material combinations from the group comprising: Ir—C, Ir—Ru—C, Ru—C, Si—C, W—C, Cu—C, Mo—C, Cr—C, Ni—C, Ti—C, wherein a proportion of carbon in the cover layer ranges from 35 to 99.99 at %.

5. The electrode unit according to claim 1, wherein the substrate is formed from stainless steel, 16MnCr5 or a rolling bearing steel.

6. The electrode unit according to claim 1, wherein the substrate is formed by a metal sheet or plate having a thickness of 1 mm or less.

7. The electrode unit according to claim 1, wherein the substrate has a three-dimensional profiling on one or both sides at least in regions, forming a flow field.

8. The electrode unit according to claim 1, wherein the coating is formed on the substrate by PVD or a combined PVD/PACVD.

9. The electrode unit according to claim 1, wherein the coating has an overall thickness in a range of 200 to 550 nm.

10. The electrode unit according to claim 1, wherein the coating covers the substrate at least in a contact region to an electrolyte of the redox flow cell.

11. A redox flow cell, comprising at least one of the electrode units according to claim 1.

12. The redox flow cell according to claim 11, comprising at least two of the electrode units, a first reaction chamber and a second reaction chamber, wherein each of the reaction chambers is in contact with one of the electrode units and wherein the reaction chambers are separated from each other by a polymer electrolyte membrane.

13. The electrode unit according to claim 3, wherein the at least one adhesion promoting layer is formed from titanium-niobium (TiNb).

14. An electrode unit for a redox flow cell, the electrode unit comprising:
    at least one metallic substrate;
    a coating applied to the substrate, the coating comprises at least one protective layer formed from at least one of titanium-niobium nitride (TiNbN) or titanium-niobium carbide (TiNbC); and
    at least one cover layer arranged on a side of the protective layer facing away from the substrate.

15. The electrode unit according to claim 14, wherein the substrate is formed from stainless steel, 16MnCr5 or a rolling bearing steel.

16. The electrode unit according to claim 14, wherein the substrate is formed by a metal sheet or plate having a thickness of 1 mm or less.

17. The electrode unit according to claim 14, wherein the substrate has a three-dimensional profiling on one or both sides at least in regions, forming a flow field.

18. The electrode unit according to claim 14, wherein the coating on the substrate is a PVD or a combined PVD/PACVD coating.

19. The electrode unit according to claim 14, wherein the coating has an overall thickness in a range of 200 to 550 nm.

20. The electrode unit according to claim 14, wherein the coating covers the substrate at least in a contact region to an electrolyte of the redox flow cell.

* * * * *